United States Patent
Singh et al.

(10) Patent No.: US 8,954,725 B2
(45) Date of Patent: Feb. 10, 2015

(54) SANITIZATION OF PACKETS

(75) Inventors: Abhishek Singh, Bellevue, WA (US); Tanmay A. Ganacharya, Kirkland, WA (US); Scott Lambert, Bellevue, WA (US); Nikola J. Livic, Seattle, WA (US); Swapnil Bhalode, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 12/437,559

(22) Filed: May 8, 2009

(65) Prior Publication Data
US 2010/0287613 A1 Nov. 11, 2010

(51) Int. Cl.
*H04L 29/06* (2006.01)

(52) U.S. Cl.
CPC ............ *H04L 63/0254* (2013.01); *H04L 63/14* (2013.01); *H04L 63/20* (2013.01); *H04L 69/22* (2013.01)
USPC .......................................... 713/151; 713/152

(58) Field of Classification Search
CPC ....................................................... H04L 29/06
USPC ................................................... 713/151–152
See application file for complete search history.

(56) References Cited

U.S. PATENT DOCUMENTS

| | | | |
|---|---|---|---|
| 7,197,762 B2 | 3/2007 | Tarquini | |
| 7,219,152 B2 | 5/2007 | Komisky | |
| 7,386,889 B2 | 6/2008 | Shay | |
| 7,458,094 B2 | 11/2008 | Jackson | |
| 7,493,659 B1 | 2/2009 | Wu et al. | |
| 7,664,855 B1 * | 2/2010 | Freed et al. | 709/225 |
| 7,773,540 B1 * | 8/2010 | Zatko | 370/254 |
| 2002/0046351 A1 | 4/2002 | Takemori et al. | |
| 2002/0188864 A1 * | 12/2002 | Jackson | 713/201 |
| 2003/0084319 A1 * | 5/2003 | Tarquini et al. | 713/200 |
| 2004/0148520 A1 * | 7/2004 | Talpade et al. | 713/201 |
| 2006/0005231 A1 | 1/2006 | Zuk et al. | |
| 2007/0002769 A1 * | 1/2007 | Matityahu et al. | 370/255 |
| 2007/0112969 A1 * | 5/2007 | Wang et al. | 709/230 |
| 2007/0192863 A1 * | 8/2007 | Kapoor et al. | 726/23 |
| 2007/0199050 A1 | 8/2007 | Meier | |

(Continued)

OTHER PUBLICATIONS

Hal Berghel and Kim Womack, "Anonymizing the Net Sanitizing packets for fun and profit", Communications of the ACM, Apr. 2003/ vol. 46, No. 4, pp. 15-20.*

(Continued)

*Primary Examiner* — Christopher Brown
*Assistant Examiner* — Roderick Tolentino
(74) *Attorney, Agent, or Firm* — Henry Gabryjelski; Kate Drakos; Micky Minhas

(57) ABSTRACT

Methods, systems, and computer-readable media are disclosed for packet sanitization. A particular method intercepts a packet of a packet stream, where the packet stream is transmitted in accordance with a particular protocol. The packet is analyzed based on a specification associated with the particular protocol. Based on the analysis, a data value of a field of the packet is replaced with a sanitized data value to create a sanitized packet. The sanitized packet may be injected into the packet stream or may optionally be forwarded to a signature module that checks the sanitized packet for malicious content. When malicious content is found, the sanitized packet may be dropped, the sanitized packet may be logged, the sanitized packet may be redirected, or a notification regarding the sanitized packet may be sent to an administrator.

19 Claims, 6 Drawing Sheets

(56) References Cited

U.S. PATENT DOCUMENTS

| | | | |
|---|---|---|---|
| 2007/0277238 A1* | 11/2007 | Margalit et al. | 726/22 |
| 2008/0134330 A1* | 6/2008 | Kapoor et al. | 726/22 |
| 2008/0168558 A1* | 7/2008 | Kratzer et al. | 726/23 |
| 2008/0229415 A1* | 9/2008 | Kapoor et al. | 726/22 |
| 2008/0271151 A1* | 10/2008 | Blake et al. | 726/25 |
| 2008/0276316 A1* | 11/2008 | Roelker et al. | 726/23 |
| 2008/0313738 A1* | 12/2008 | Enderby | 726/24 |
| 2009/0279548 A1* | 11/2009 | Davis et al. | 370/394 |

OTHER PUBLICATIONS

Jens Tolle, Marko Jahnke; Nils gentschen Felde; Peter Martini, "Impact of Sanitized Message Flows in a Cooperative Intrusion Warning System", IEEE Military Communications Conference, MILCOM 2006, Oct. 23-25, 2006, pp. 1-7.*

"Cisco IPS-4250 V5.0 (3) Techinical Evaluation", "NNS", Jul. 2005, pp. 1-59.*

"A Pragmatic Methodology for Testing Intrusion Prevention Systems", Retrieved at<<http://comjnl.oxfordjournals.org/cgi/content/abstract/bxn043v1>>, The Computer Journal Advance Access published online on Sep. 2, 2008, pp. 2.

Inoue Hajime, "Security in Dynamic Execution Environments", Retrieved at<<http://www.cs.unm.edu/~hinoue/dissertation/proposal.pdf>>, Sep. 27, 2001, pp. 24.

"Bro Intrusion Detection System Hands-On Workshop: Bro Overview", Retrieved at<<http://www.bro-ids.org/bro-workshop-2009/slides/BroDesign.pdf>>, pp. 18.

"Cisco IPS-4240 V5.0(3)", Retrieved at<<http://www.nsslabs.com/grouptests/ips/edition3/pdf/Cisco%20IPS-4240%20V5.0(3)%20WP.pdf>>, "NSS", Jul. 2005, pp. 65.

Smeets, Marc et al, "Research Report: Covert Channels", Retrieved at <<http://staff.science.uva.nl/~delaat/snb-2005-2006/p27/report.pdf>>, University of Amsterdam, Feb. 15, 2006, pp. 43.

Cisco Systems, "TCP Drop—Data in SYNACK", Retrieved at <<https://tools.cisco.com/security/center/viewIpsSignature.x?signatureId=1330&signatureSubId=9&softwareVersion=6.0&releaseVersion=S242>>, pp. 3.

"International Search Report and Written Opinion", Mailed Date: Nov. 26, 2010, received from the International Searching Authority (KIPO) for International Application No. PCT/US2010/033256, Filed Date: Apr. 30, 2010, 9 Pages.

Tolle, et al., "Impact of Sanitized Message Flows in a Cooperative Intrusion Warning System", Retrieved at << http://www.marko-jahnke.de/docs/work/milcom06.pdf >>, Proceedings of the 2006 IEEE conference on Military communications, Oct. 23-25, 2006, 7 Pages.

Notice on the First Office Action received from the State Intellectual Property Office of the Peoples's Republic of China, dated Oct. 8, 2013, with English translation, 12 pages.

* cited by examiner

SANITIZATION OF PACKETS

BACKGROUND

Information Technology (IT) professionals and IT departments often deploy network security systems in an effort to prevent security threats from compromising a computing environment. Network security systems frequently include tools to monitor network traffic, such as Internet traffic, for known security threats.

Monitoring network traffic can include examining individual packets that make up the network traffic. However, the individual packets are typically examined for known security threats. Consequently, security threats that are unknown may not be detected.

SUMMARY

The present disclosure describes protocol sanitization in accordance with published specifications, such as protocol specifications, request for comments (RFC) documents, Internet drafts, research publications, conference publications and slides, and documented expected application behavior characteristics. Packets of a packet stream flowing in and out of a computing environment are intercepted. The packet stream is transmitted in accordance with a particular protocol. The packets are analyzed based on a specification for the particular protocol. When the analysis indicates that a particular packet includes fields that contain questionable (e.g., invalid) data values, the data values may be replaced with sanitized values to create a sanitized packet. The sanitized packet is then injected back into the packet stream.

The resulting sanitized packet may be subject to signature-based verification, where the sanitized packet is compared to malicious packet signatures. If a match is found, security actions may be taken (e.g., dropping the packet, rewriting the packet, logging the packet, or redirecting the packet).

The sanitized values may be retrieved from a list of common values included in a published specification associated with the particular protocol. Thus, the system may enforce and spread the use of practices in compliance with published standards for the protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes intercepting a packet of a packet stream. The packet stream includes data transmitted in accordance with a particular protocol. The method also includes analyzing the packet based on a specification associated with the particular protocol. Based on the analysis, a data value of a field of the packet may be replaced with a sanitized data value to create a sanitized packet. The method includes injecting the sanitized packet into the packet stream.

In another particular embodiment, a system is disclosed that includes a network interface, an analysis module, and a sanitization module. The network interface is configured to intercept a packet of a packet stream and to inject a sanitized packet into the packet stream. The packet and the sanitized packet conform to a particular protocol. The analysis module is configured to compare the packet to a protocol specification for the particular protocol. The sanitization module is configured to identify any field of the packet that contains an invalid data value. The sanitization module is further configured to replace the invalid data value with a sanitized data value to form the sanitized packet.

In another particular embodiment, a computer-readable medium is disclosed that includes instructions, that when executed by a computer, cause the computer to receive a packet of a packet stream, where the packet stream is transmitted in a particular network protocol. The computer-readable medium also includes instructions, that when executed by the computer, cause the computer to analyze the packet based on a specification associated with the network protocol. Based on the analysis, an invalid data value in a particular field of the packet is identified. The computer-readable medium includes instructions, that when executed by the computer, cause the computer to retrieve a sanitized data value from a list of common data values for the particular field. The computer-readable medium also includes instructions, that when executed by the computer, cause the computer to replace the invalid data value in the particular field with the sanitized data value to form a sanitized packet. The sanitized packet is compared to one or more malicious packet signatures to form a sanitized and signature-verified packet. The computer-readable medium includes instructions, that when executed by the computer, cause the computer to transmit the sanitized and signature-verified packet to a destination computing device when the comparison does not identify a match between the sanitized packet and any of the one or more malicious packet signatures.

Figure 1:
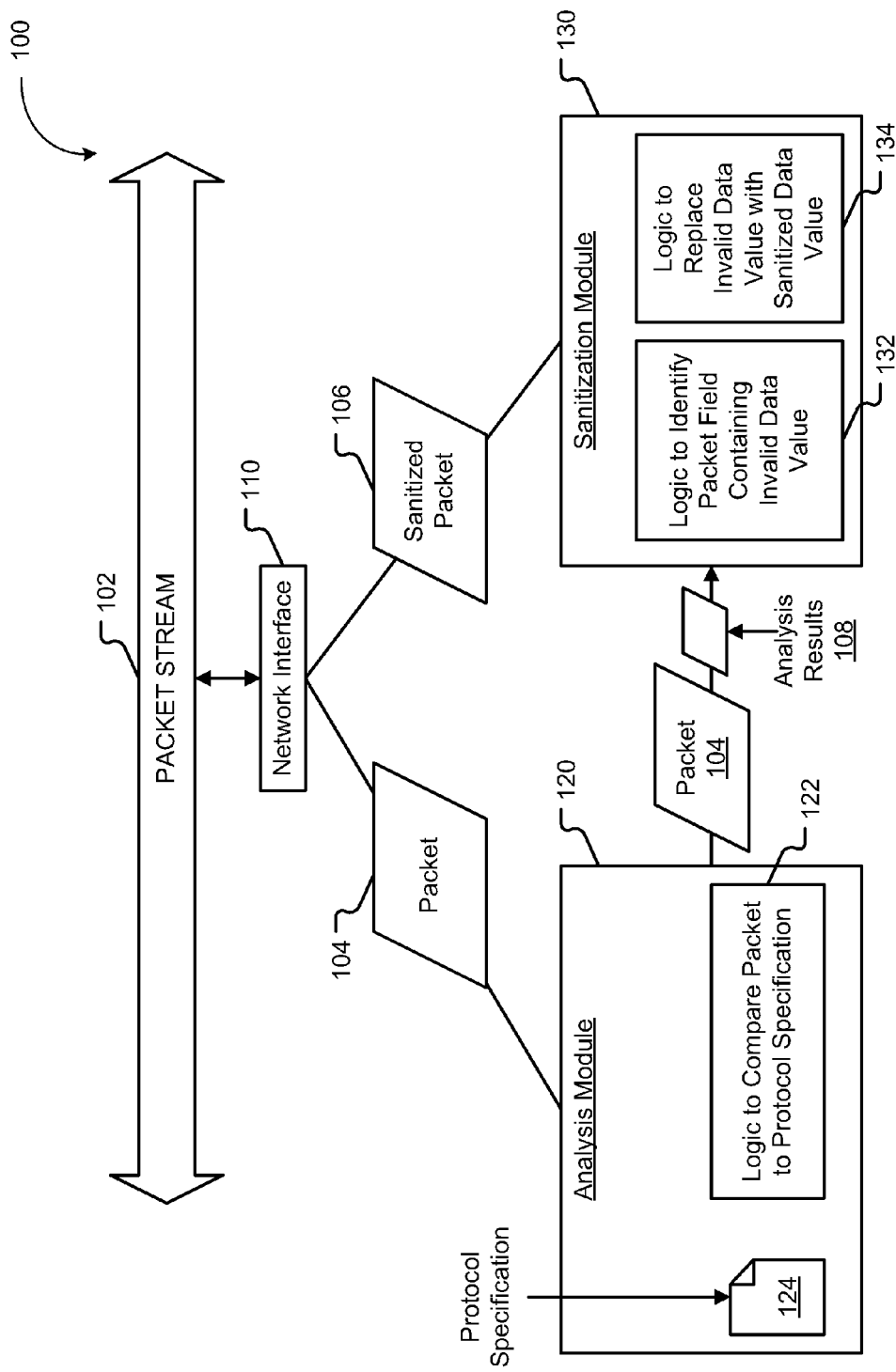
FIG. 1 is a block diagram to illustrate a particular embodiment of a packet sanitization system.

FIG. 1 is a block diagram to illustrate a particular embodiment of a packet sanitization system 100. The system 100 includes a network interface 110 configured to intercept packets (e.g., a packet 104) of a packet stream 102. The network interface 110 is also configured to inject packets, such as a sanitized packet 106, into the packet stream 102. The network interface 110 is communicatively coupled to an analysis module 120 and to a sanitization module 130. The analysis module 120 and the sanitization module 130 are also communicatively coupled to each other.

The packet stream 102 may be transmitted in accordance with a particular protocol. By way of example, and not limitation, the particular protocol may include hypertext transfer protocol (HTTP), hypertext transfer protocol secure (HTTPS), file transfer protocol (FTP), transport control protocol (TCP), Internet control message protocol (ICMP), server message block (SMB), simple network management protocol (SNMP), Internet message access protocol (IMAP), tabular data stream (TDS), post office protocol (POP3), simple mail transfer protocol (SMTP), or remote procedure call (RPC). The network interface 110 may be a wired data communication interface such as an Ethernet interface or a wireless data communication interface such as an IEEE 802.11 compatible wireless interface. The network interface 110 may intercept packets, such as the packet 104, of the packet stream 102 and send the intercepted packets to the analysis module 120.

The analysis module 120 is configured to receive intercepted packets from the network interface 110 and may include logic 122 to compare the intercepted packets to a protocol specification 124. The logic 122 may compare the packet 104 to the protocol specification 124. In a particular embodiment, the protocol specification 124 includes a request for comments (RFC) document associated with the particular protocol or an Internet draft associated with the particular protocol. In another particular embodiment, the protocol specification 124 includes documented expected application behavior characteristics of an application associated with the particular protocol. For example, the protocol specification 124 may indicate that HTTP packets transmitted by a particular web browser generally include a header section that conforms to a particular format. The analysis module 120 may also be configured to send the packet 104 and analysis results 108 to the sanitization module 130.

The sanitization module 130 may receive the packet 104 and the analysis results 108 regarding the packet 104 from the analysis module 120. The sanitization module 130 may include logic 132 to identify a packet field containing an invalid data value. For example, the logic 132 may identify a field of the packet 104 that contains an invalid data value based on the analysis results 108 (and thus based on the protocol specification 124). It should be noted that the invalid data value need not be malicious. Instead, the invalid data values may be non-compliant with published protocol specifications (e.g., the packet 104 may include a data field that has a length larger than the maximum acceptable length provided in a published protocol specification). The data values may also deviate from documented expected application behavior.

The sanitization module 130 may also include logic 134 to replace an invalid data value with a sanitized data value, thereby creating a sanitized packet 106. The sanitization module 130 is configured to send sanitized packets, such as the sanitized packet 106, to the network interface 110 for reinjection into the packet stream 102. In a particular embodiment, the packet 104 includes a checksum value, and the sanitization module 130 recalculates the checksum value for the sanitized packet 106 prior to sending the sanitized packet 106 to the network interface. The checksum value may need to be recalculated due to the difference in data between the packet 104 and the sanitized packet 106.

The analysis module 120 and the sanitization module 130 may operate at one or more layers of the Open Systems Interconnection (OSI) Reference Model that are higher than the network layer. For example, the analysis module 120 and the sanitization module 130 may operate at one or more of the transport layer, the session layer, the presentation layer, or the application layer.

In a particular embodiment, the analysis module 120 and the sanitization module 130 are located in the same place (e.g., at the same computing device). The computing device may be a personal computer, a server, a gateway, a firewall, a host-based intrusion detection and prevention system, or some other computing device. Alternatively, the analysis module 120 and the sanitization module 130 may be distributed (i.e., located in different places). For example, the analysis module 120 and the sanitization module 130 may be located at different computing devices of a distributed intrusion detection and prevention system.

In operation, the network interface 110 may intercept the packet 104 of the packet stream 102, where the packet stream 102 is transmitted in accordance with a particular protocol. For example, the packet 104 may be an Internet control message protocol (ICMP) packet. The network interface 110 may then send the intercepted packet 104 to the analysis module 120. The analysis module 120 may compare the packet 104 to the protocol specification 124. In this case, the protocol specification 124 is related to ICMP because the packet 104 is an ICMP packet. For example, the protocol specification 124 may include RFC 792, a published RFC document associated with ICMP. When the protocol specification 124 includes RFC 792, the comparison may include comparing the packet 104 to various acceptable message formats provided for ICMP packets provided in RFC 792. The analysis module 120 may then send the packet 104 and the analysis results 108 to the sanitization module 130.

The logic 132 to identify a packet field containing an invalid data value of the sanitization module 130 may identify a field of the packet 104 that contains an invalid data value. For example, the logic 132 may identify that although the packet 104 is an ICMP echo_request packet or an ICMP echo_reply packet, the packet 104 includes a data field that contains information. In ICMP, echo_request and echo_reply packets are used in "pinging" remote computing devices, to detect whether the remote computing devices are accessible via a network. Accordingly, although the ICMP specification (and RFC 792) allows ICMP packets to have data payloads, echo_request and echo_reply packets usually have empty data fields (RFC 792 indicates that the data field values may be disregarded when processing echo_request and echo_reply packets). When an echo_request packet or an echo_reply packet has information in the data field, a remote attacker may be attempting to covertly communicate information (e.g., secure information such as credit card numbers and social security numbers) via the data field. It will thus be appreciated that the logic 132 may identify potentially harmful data in a packet even when the data is compliant with a protocol specification.

Once it has been determined that the packet 104 includes a field that contains an invalid data value, the logic 134 to replace an invalid data value with a sanitized data value may replace the invalid data value in the packet 104 with a sanitized data value to form the sanitized packet 106. For example, when the packet 104 is an ICMP echo_request or echo_reply packet with information in the data field, the logic 134 may delete the information from the data field (e.g., replace the information with a sequence of binary zeroes), thereby forming the sanitized packet 106. The sanitization module 130 may then send the sanitized packet 106 to the network interface 110, and the network interface 110 may inject the sanitized packet 106 into the packet stream 102.

It will be appreciated that the system 100 of FIG. 1 may enable high-level packet sanitization. For example, the system 100 of FIG. 1 may enable packet sanitization at the transport, session, presentation, and application layer of the OSI Reference Model. It will also be appreciated that the system 100 of FIG. 1 may sanitize packets even when the packets contain data that is not known to be malicious (e.g., non-compliant with published protocol specifications or deviating from expected application behavior).

Figure 2:
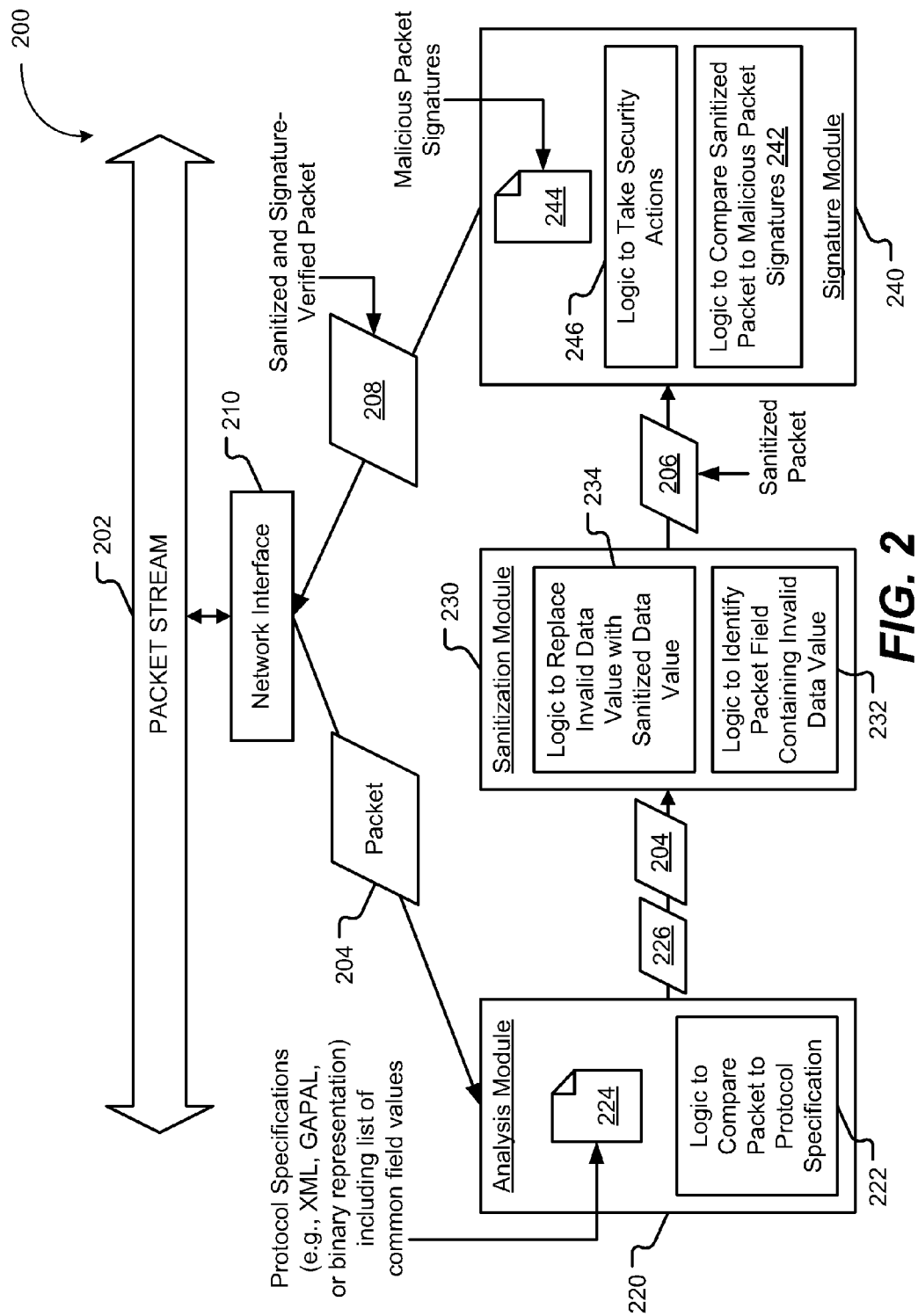
FIG. 2 is a block diagram to illustrate another particular embodiment of packet sanitization system.

FIG. 2 is a block diagram to illustrate another particular embodiment of packet sanitization system 200. The system 200 includes a network interface 210 configured to intercept packets (e.g., a representative packet 204) of a packet stream 202. The network interface is also configured to inject packets, such as a sanitized and signature-verified packet 208, into the packet stream 202. The system 200 also includes an analysis module 220 and a signature module 240 communicatively coupled to the network interface 210 and to a sanitization module 230. In an illustrative embodiment, the packet stream 202 is the packet stream 102 of FIG. 1, the analysis module 220 is the analysis module 120 of FIG. 1, and the sanitization module 230 is the sanitization module 130 of FIG. 1.

The packet stream 202 may be transmitted in accordance with a particular protocol. The network interface 210 may be a wired data communication network interface or a wireless data communication network interface. Upon intercepting a packet of the packet stream 202, the network interface 210 may send the intercepted packet to the analysis module 220. For example, the network interface 210 may intercept the packet 204 and send the packet 204 to the analysis module 220.

The analysis module 220 is configured to receive intercepted packets from the network interface 210 and may include logic 222 to compare the intercepted packets to a protocol specification 224. For example, the logic 222 may compare the packet 204 to the protocol specification 224. In a particular embodiment, the protocol specification 224 includes a request for comments (RFC) document associated with the particular protocol, an Internet draft associated with the particular protocol, or expected application behavior associated with the particular protocol. The protocol specification 224 may be defined in a language such as extensible markup language (XML), generic application level protocol analyzer language (GAPAL), a binary representation, or some other language. The protocol specification 224 may be defined in any language. The analysis module 220 may also be configured to send the packet 204 and analysis results 226 to the sanitization module 230.

The sanitization module 230 may receive the packet 204 and the analysis results 226 regarding the packet 204 from the analysis module 220. The sanitization module 230 may include logic 232 to identify a packet field containing an invalid data value. For example, the logic 232 may identify a field of the packet 204 that contains an invalid data value based on the analysis results 226 (and thus based on the protocol specification 224). It should be noted that the invalid value need not be malicious. For example, the invalid data values may be non-compliant with published protocol specifications or deviate from normal behavior.

The sanitization module 230 may also include logic 234 to replace an invalid data value with a sanitized data value, thereby creating a sanitized packet 206. In a particular embodiment, the sanitized data value is retrieved from a list that contains common field values for various protocols. The list of common field values may be included in the protocol specification 224 or may be located elsewhere. Alternatively, the sanitized value may be user-specified and user-modifiable when a security rating of the field is a low security rating and may be system-specified and non user-modifiable when the security rating of the field is a high security rating. The sanitization module 230 may also be configured to send sanitized packets, such as the sanitized packet 206, to the signature module 240. In a particular embodiment, the sanitization module 130 may also replace valid data values with sanitized data values to create the sanitized packet 206.

The signature module 240 is configured to receive sanitized packets from the sanitization module 230. The signature module 240 may include logic 242 to compare a sanitized packet to malicious packet signatures 244 and logic 246 to take security actions based on the comparison, thereby creating a sanitized and signature-verified packet 208. For example, the logic 242 may compare the sanitized packet 206 to the malicious packet signatures 244, and the logic 246 may take a security action if a match between the sanitized packet 206 and any of the malicious packet signatures 244 is found. The malicious packet signatures 244 may include signatures associated with malwares, security exploits, or network intrusion attempts. For example, the malicious packet signatures 244 may include signatures of packets known to contain computer virus payloads. Security actions may include, but are not limited to, dropping the sanitized packet 206, rewriting the sanitized packet 206, logging the sanitized packet 206, redirecting the sanitized packet 206, or sending a notification regarding the sanitized packet 206 to an administrator. The notification may be instant or near-instant and may be in the form of a simple messaging system (SMS) message or an electronic mail (e-mail). For example, the sanitized packet 206 may be dropped (e.g., discarded without being forwarded), rewritten to include non-malicious data (e.g., a known malicious payload may be replaced with zeroes), logged in a network security incident log (e.g., a log used by system administrators to gauge the effectiveness of network security measures), or redirected to a computing device other than the intended recipient of the packet for further analysis (e.g., a system administrator's computer or a honeypot for attack simulation). When the logic 246 to take security actions does not drop the sanitized packet, the signature module 240 may send the resulting sanitized and signature-verified packet 208 to the network interface 210 for injection into the packet stream 202.

In operation, the network interface 210 may intercept a packet of the packet stream 202 that is transmitted in accordance with a particular protocol. For example, the packet 204 may be a Remote Procedure Call (RPC) packet. The network interface 210 may send the intercepted packet 204 to the analysis module 220. The analysis module 220 may compare the packet 204 to the protocol specification 224, where the protocol specification is related to RPC. For example, the protocol specification 224 may be a GAPAL specification for RPC. The analysis module 220 may then send the packet 204 and the results of the analysis 226 to the sanitization module 230.

The logic 232 to identify a packet field containing an invalid data value may identify a field of the packet 204 that contains an invalid data value. For example, the logic 232 may identify that the packet 204 includes the pattern "..\" in a field that will be passed to RPC's universal naming convention (UNC) canonicalization function. It should be noted that such a pattern was used as a propagation vector by the "Conficker" worm. Once it has been determined that the packet 204 includes a field that may contain an invalid data value, the logic 234 to replace an invalid data value with a sanitized data value may replace the invalid data value in the packet 204 with a sanitized data value, thereby creating the sanitized packet 206. For example, the sanitized packet 206 may be created by removing the "..\" pattern, along with the directory name before the pattern, from the field as per the protocol specification 224. The sanitization module 230 may then send the sanitized packet 206 to the signature module 240.

The signature module 240 may compare the sanitized packet 206 to the malicious packet signatures 244, where the malicious packet signatures 244 include signatures of malicious RPC packets. In a particular embodiment, the comparison includes examining the sanitized packet 206 for an occurrence of a regular expression associated with the malicious packet signatures 244. Based on the comparison, the signature module 240 may take a security action. For example, the sanitized packet 206 may be logged. The signature module 240 may then send a resulting sanitized and signature-verified packet 208 to the network interface 210, and the network interface 210 may then inject the sanitized and signature-verified packet 208 into the packet stream 202 for subsequent transmission and processing.

It will be appreciated that the system 200 of FIG. 2 is compatible with protocol specifications that may be defined in various languages. As such, the system 200 of FIG. 2 may be used with third-party protocol specifications. Compatibility with third-party protocol specifications may reduce the work required by system administrators to keep the system 200 of FIG. 2 updated with changes in protocol technologies. It will also be appreciated that by replacing invalid field values with common field values and by not permitting users to modify sanitized values for high security rated fields, the system 200 of FIG. 2 may enforce protocol security practices based on published and peer-reviewed standards. It will further be appreciated that the system 200 of FIG. 2 may take security actions based on comparisons between sanitized packets and malicious packet signatures, further reducing the chances that a malicious packet passes through the system 200 of FIG. 2 undetected.

Figure 3:
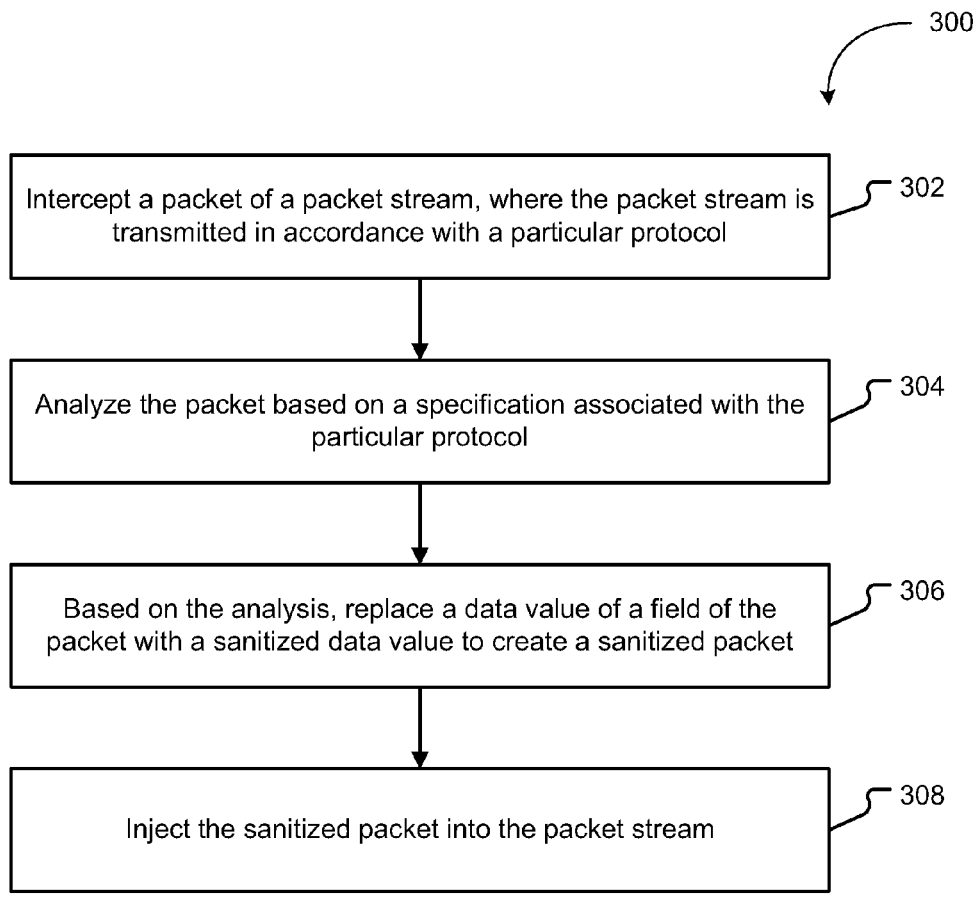
FIG. 3 is a flow diagram to illustrate a particular embodiment of a method of packet sanitization.

FIG. 3 is a flow diagram to illustrate a particular embodiment of a method 300 of packet sanitization. In an illustrative embodiment, the method 300 may be performed by the system 100 of FIG. 1 or the system 200 of FIG. 2.

The method 300 includes intercepting a packet of a packet stream, at 302. The packet stream is transmitted in accordance with a particular protocol. For example, in FIG. 1, the network interface 110 may intercept the packet 104 of the packet stream 102, where the packet 104 is an ICMP packet.

The method 300 also includes analyzing the packet based on a specification associated with the particular protocol, at 304. For example, in FIG. 1, the analysis module 120 may analyze the ICMP packet 104 based on the protocol specification 124, where the protocol specification 124 is associated with ICMP.

The method 300 further includes, based on the analysis, replacing a data value of a field of the packet with a sanitized data value to create a sanitized packet, at 306. For example, in FIG. 1, the sanitization module 130 may replace a data value of a field of the ICMP packet 104 to create the sanitized packet 106.

The method 300 includes injecting the sanitized packet into the packet stream, at 308. For example, in FIG. 1, the network interface 110 may inject the sanitized packet 106 into the packet stream 102.

It will be appreciated that the method 300 of FIG. 3 may enable high-level packet sanitization based on protocol specification, including the sanitization of packets that contain data not known to be malicious (e.g., non-compliant with published protocol specifications or deviating from expected behavior). It will thus be appreciated that the method 300 of FIG. 3 may identify unknown malwares that are in the wild or that are not yet fully developed and being tested.

Figure 4:
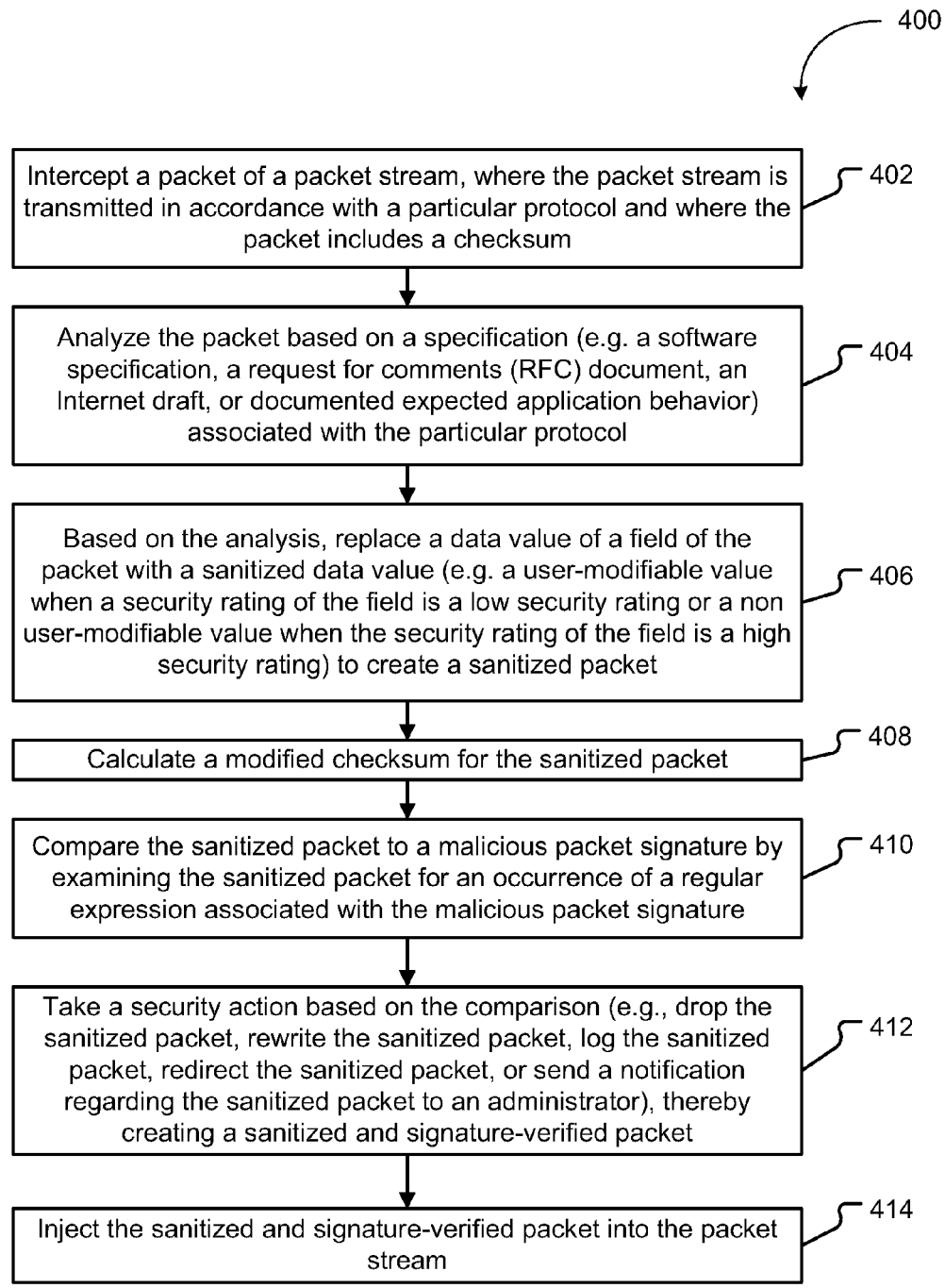
FIG. 4 is a flow diagram to illustrate another particular embodiment of a method of packet sanitization.

FIG. 4 is a flow diagram to illustrate another particular embodiment of a method 400 of packet sanitization. In an illustrative embodiment, the method 400 may be performed by the system 200 of FIG. 2.

The method 400 includes intercepting a packet of a packet stream, at 402. The packet stream is transmitted in accordance with a particular protocol and the packet includes a checksum. For example, in FIG. 2, the network interface 210 may intercept the packet 204 of the packet stream 202, where the packet stream 202 is transmitted in accordance with a particular protocol (e.g., RPC).

The method 400 also includes analyzing the packet based on a specification associated with the particular protocol, at 404. The specification may be a protocol specification, an RFC document, an Internet draft, or may include expected behavior characteristics of a computer application associated with the particular protocol. For example, in FIG. 2, the analysis module 220 may compare the packet 204 with the protocol specification 224 (e.g., an RPC protocol specification). The protocol specification 224 is discussed herein with respect to FIG. 2.

The method 400 further includes, based on the analysis, replacing a data value of a field of the packet with a sanitized data value to create a sanitized packet, at 406. The sanitized data value may be user-modifiable when a security rating of the field is a low security rating or a non user-modifiable value when the security rating of the field is a high security rating. For example, in FIG. 2, the sanitization module 230 may replace a data value of a field of the packet 204, thereby creating the sanitized packet 206.

The method 400 includes calculating a modified checksum for the sanitized packet, at 408. For example, in FIG. 2, the sanitization module 230 may calculate a modified checksum for the sanitized packet 206.

The method 400 also includes comparing the sanitized packet to a malicious packet signature, at 410. The comparison may include examining the sanitized packet for an occurrence of a regular expression associated with the malicious packet signature. For example, in FIG. 2, the signature module 240 may compare the sanitized packet 206 to the malicious packet signatures 244.

The method 400 further includes taking a security action based on the comparison with the malicious packet signatures and creating a sanitized and signature verified packet, at 412. The security action may include dropping the sanitized packet, rewriting the sanitized packet, logging the sanitized packet, redirecting the sanitized packet, or sending a notification regarding the sanitized packet to an administrator. For example, in FIG. 2, the signature module 240 may take a security action based on the signature comparison (e.g., rewrite malicious values in the sanitized packet 206 with zeroes).

The method 400 includes injecting the sanitized and signature-verified packet into the packet stream, at 414. For example, in FIG. 2, the network interface 210 may inject the sanitized and signature-verified packet 208 into the packet stream 202.

It will be appreciated that the method 400 of FIG. 4 enables both sanitization as well as signature verification of packets. It will also be appreciated that by calculating a modified checksum for the sanitized packet, the method 400 of FIG. 4 may comply with protocol security policies that automatically drop a particular packet when the checksum of the particular packet does not correspond to the data of the particular packet (i.e., the particular packet has been modified during transit).

Figure 5:
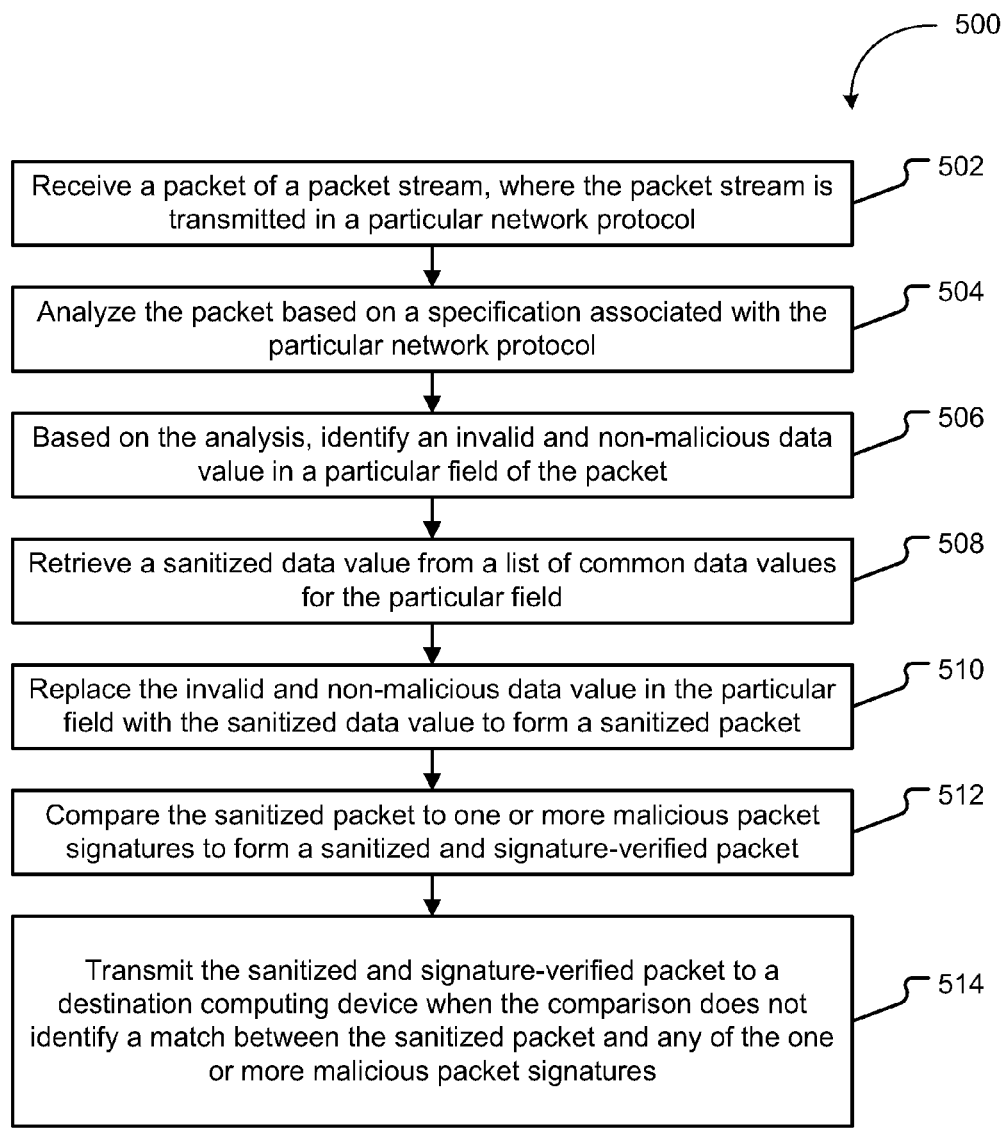
FIG. 5 is a flow diagram to illustrate another particular embodiment of a method of packet sanitization.

FIG. 5 is a flow diagram to illustrate another particular embodiment of a method 500 of packet sanitization. In an illustrative embodiment, the method 500 may be performed by the system 200 of FIG. 2.

The method 500 includes receiving a packet of a packet stream, at 502. The packet stream is transmitted in a particular network protocol. For example, referring to FIG. 2, the analysis module 220 may receive the packet 204 from the network interface 210.

The method 500 also includes analyzing the packet based on a specification associated with the particular network protocol, at 504. For example, referring to FIG. 2, the analysis module 220 may compare the packet 204 with the protocol specification 224.

The method 500 further includes, based on the analysis, identifying an invalid and non-malicious data value in a particular field of the packet, at 506. For example, referring to FIG. 2, the analysis module 220 may identify an invalid and non-malicious data value in a particular field of the packet 204.

The method 500 includes retrieving a sanitized data value from a list of common data values for the particular field, at 508. For example, referring to FIG. 2, the sanitization module 230 may retrieve a sanitized value from a list of common data values for the particular field.

The method 500 also includes replacing the invalid and non-malicious data value in the particular field with the sanitized data value to form a sanitized packet, at 510. For example, referring to FIG. 2, the sanitization module 230 may replace the invalid and non-malicious data value with the sanitized data value to form the sanitized packet 206.

The method 500 further includes comparing the sanitized packet to one or more malicious packet signatures to form a sanitized and signature-verified packet, at 512. For example, referring to FIG. 2, the signature module 240 may compare the sanitized packet 206 to the malicious packet signatures 244 and may form the sanitized and signature-verified packet 208.

The method 500 includes transmitting the sanitized and signature-verified packet to a destination computing device when the comparison does not identify a match between the sanitized packet and any of the one or more malicious packet signatures, at 514. For example, referring to FIG. 2, the network interface 210 may transmit the sanitized and signature-verified packet 208 to a destination computing device by injecting the sanitized and signature-verified packet 208 into the packet stream 202.

It will be appreciated that the method 500 of FIG. 5 may enforce defined protocol practices by replacing invalid and non-malicious data values in packets with sanitized values based on a protocol specification. For example, in the case of ICMP, the method 500 of FIG. 5 may enforce ICMP security practices by removing data in the data field of ICMP echo_request packets and ICMP echo_reply packets.

Figure 6:
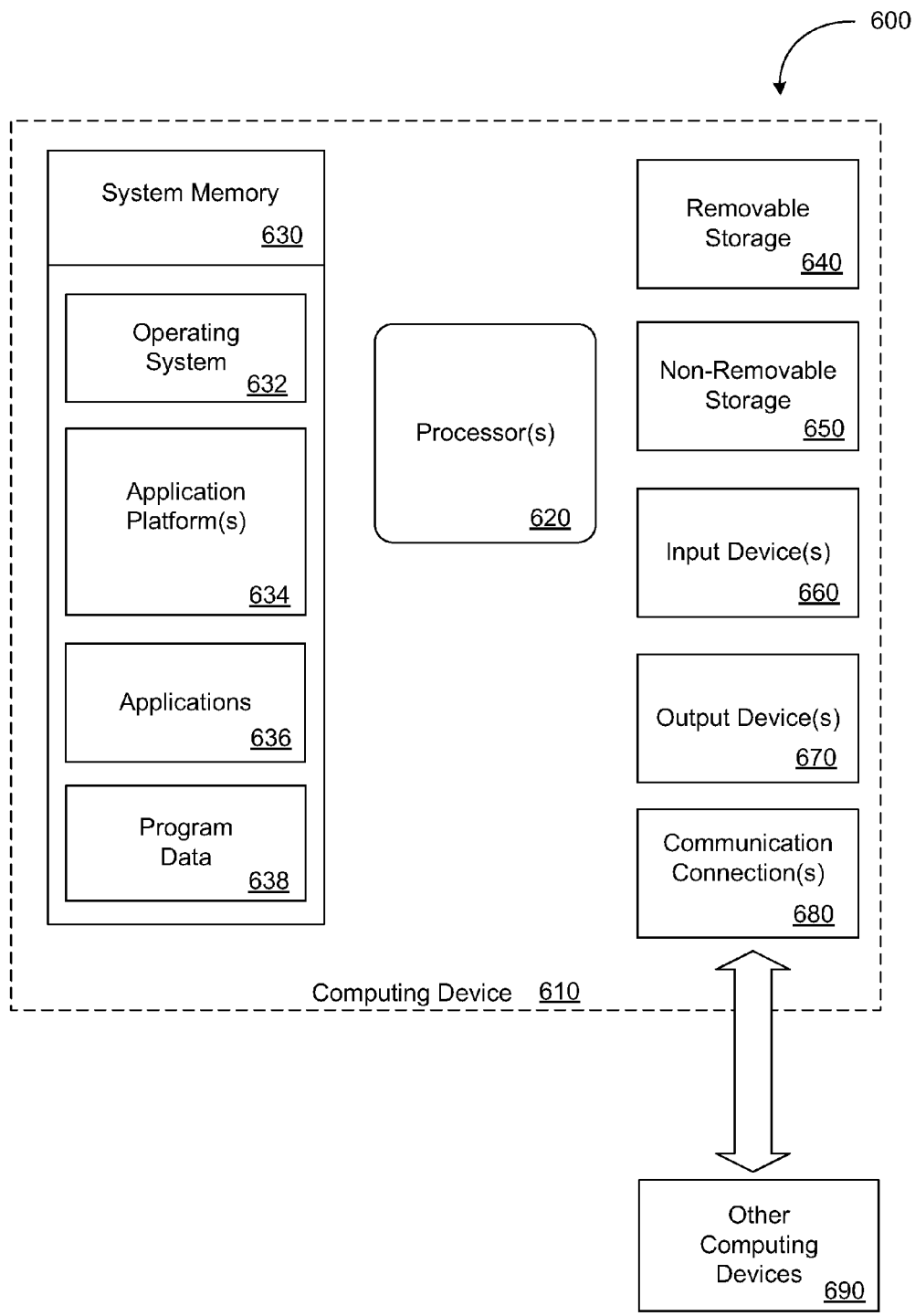
FIG. 6 is a block diagram of a computing environment including a computing device operable to support embodiments of computer-implemented methods, computer program products, and system components as illustrated in FIGS. 1-5.

FIG. 6 shows a block diagram of a computing environment 600 including a computing device 610 operable to support embodiments of computer-implemented methods, computer program products, and system components according to the present disclosure. In an illustrative embodiment, the computing device 610 may include one or more of the system components 120 and 130 of FIG. 1 or the system components 220, 230, and 240 of FIG. 2. Each of the components 120 and 130 of FIG. 1 or the components 220, 230, and 240 of FIG. 2 may include the computing device 610 or a portion thereof.

The computing device 610 typically includes at least one processor 620 and system memory 630. Depending on the configuration and type of computing device, the system memory 630 may be volatile (such as random access memory or "RAM"), non-volatile (such as read-only memory or "ROM," flash memory, and similar memory devices that maintain stored data even when power is not provided) or some combination of the two. The system memory 630 typically includes an operating system 632, one or more application platforms 634, one or more applications 636, and may include program data 638. In an illustrative embodiment, the system memory 630 may include one or more modules as disclosed herein. For example, the system memory 630 may include one or more of the analysis module 120 of FIG. 1 and the sanitization module 130 of FIG. 1. As another example, the system memory 630 of FIG. 6 may include one or more of the analysis module 220 of FIG. 2, the sanitization module 230 of FIG. 2, and the signature module 240 of FIG. 2.

The computing device 610 may also have additional features or functionality. For example, the computing device 610 may also include removable and/or non-removable additional data storage devices such as magnetic disks, optical disks, tape, and standard-sized or miniature flash memory cards. Such additional storage is illustrated in FIG. 6 by removable storage 640 and non-removable storage 650. Computer storage media may include volatile and/or non-volatile storage and removable and/or non-removable media implemented in any method or technology for storage of information such as computer-readable instructions, data structures, program components or other data. The system memory 630, the removable storage 640 and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by computing device 610. Any such computer storage media may be part of the computing device 610. The computing device 610 may also have input device(s) 660, such as a keyboard, mouse, pen, voice input device, touch input device, etc. Output device(s) 670, such as a display, speakers, printer, etc. may also be included.

The computing device 610 also contains one or more communication connections 680 that allow the computing device 610 to communicate with other computing devices 690 over a wired or a wireless network. In an illustrative embodiment, the communication connections 680 include the network interface 110 of FIG. 1 or the network interface 210 of FIG. 2.

The one or more communication connections 680 are an example of communication media. By way of example, and not limitation, communication media may include wired media such as a wired network or direct-wired connection, and wireless media, such as acoustic, radio frequency (RF), infrared and other wireless media. It will be appreciated, however, that not all of the components or devices illustrated in FIG. 6 or otherwise described in the previous paragraphs are necessary to support embodiments as herein described. For example, the input device(s) 660 and output device(s) 670 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and processes or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable any person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
intercepting a packet of a packet stream, wherein the packet stream is transmitted in accordance with a particular protocol;
analyzing the packet based on a comparison of the packet to a specification associated with the particular protocol;
based on the analysis, replacing an invalid data value of a field of the packet with a sanitized data value to create a sanitized packet; and
injecting the sanitized packet into the packet stream, wherein the sanitized data value is selectively modifiable based on a security rating of the field, such that the sanitized data value is modifiable by a user of a computer that intercepted the packet when the security rating of the field is a low security rating, and wherein the sanitized data value is not modifiable by the user of the computer that intercepted the packet when the security rating of the field is a high security rating.

2. The method of claim 1, wherein the data value is not a malicious data value.

3. The method of claim 1, wherein the specification is one of a protocol specification for the particular protocol, a request for comments (RFC) document associated with the particular protocol, and an Internet draft associated with the particular protocol.

4. The method of claim 1, wherein the specification includes documented expected behavior characteristics of a computer application associated with the particular protocol.

5. The method of claim 1, wherein the packet includes a checksum and wherein the method further comprises calculating a modified checksum for the sanitized packet.

6. The method of claim 1, further comprising maintaining a list of common field data values for the particular protocol and wherein the sanitized data value is a common field data value for the field.

7. The method of claim 6, wherein the list of common field data values for the particular protocol is included in the specification associated with the particular protocol.

8. The method of claim 1, further comprising, after the invalid data value is replaced with the sanitized data value, comparing the sanitized packet to one or more signatures.

9. The method of claim 8, wherein the one or more signatures include a signature of a malicious packet.

10. The method of claim 9, wherein the sanitized packet is examined for an occurrence of a regular expression associated with the signature of the malicious packet.

11. The method of claim 1, further comprising taking a security action wherein the security action includes at least one of dropping the sanitized packet, rewriting the sanitized packet, logging the sanitized packet, redirecting the sanitized packet, or sending a notification regarding the sanitized packet to an administrator.

12. The method of claim 1, wherein the particular protocol is a networking protocol.

13. A system comprising:
a processor;
a system memory in operable communication with the processor and comprising an analysis module and a sanitization module;
a network interface configured to intercept a packet of a packet stream and to inject a sanitized packet into the packet stream, wherein the packet and the sanitized packet conform to a particular protocol;
wherein the analysis module is executable by the processor to compare the packet to a protocol specification for the particular protocol; and
wherein the sanitization module is executable by the processor to identify a field of the packet that contains an invalid data value based on the comparison performed by the analysis module and to replace the invalid data value with a sanitized data value to form the sanitized packet.

14. The system of claim 13, further comprising, in the system memory, a signature module executable by the processor to compare the sanitized packet to one or more malicious packet signatures.

15. The system of claim 13, wherein the analysis module and the sanitization module operate at one or more layers of an Open Systems Interconnection (OSI) Reference Model that are higher than a network layer.

16. The system of claim 15, wherein the one or more layers of the OSI Reference model that are higher than the network layer include a transport layer, a session layer, a presentation layer, an application layer, or any combination thereof.

17. A computer-readable storage device comprising instructions, that when executed by a computer, cause the computer to:
- receive a packet of a packet stream, wherein the packet stream is transmitted according to a particular network protocol;
- analyze the packet based on a comparison of the packet to a specification associated with the particular network protocol;
- based on the analysis, identify an invalid and non-malicious data value in a particular field of the packet;
- retrieve a sanitized data value from a list of common data values for the particular field, the list of common data values defined by the specification;
- replace the invalid and non-malicious data value in the particular field with the sanitized data value, while retaining data values in other fields of the packet, to form a sanitized packet, wherein the sanitized data value is selectively user-modifiable based on a security level of the particular field;
- compare the sanitized packet to one or more malicious packet signatures to form a sanitized and signature-verified packet; and
- transmit the sanitized and signature-verified packet to a destination computing device when the comparison does not identify a match between the sanitized packet and any of the one or more malicious packet signatures.

18. The computer-readable storage device of claim 17, further comprising instructions, that when executed by the computer, cause the computer to log the sanitized packet, drop the sanitized packet, or redirect the sanitized packet when the comparison identifies a match between the sanitized packet and the one or more malicious packet signatures.

19. The computer-readable storage device of claim 17, wherein the specification is represented in an extensible markup language (XML), a generic application level protocol analyzer language (GAPAL), a binary representation, or any combination thereof.

* * * * *